(12) United States Patent
Sakai et al.

(10) Patent No.: US 6,466,551 B2
(45) Date of Patent: *Oct. 15, 2002

(54) SIMPLEX/DUPLEX SWITCHING SYSTEM

(75) Inventors: Masataka Sakai; Naoshi Miyashita, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,523

(22) Filed: Oct. 15, 1998

(65) Prior Publication Data
US 2002/0118651 A1 Aug. 29, 2002

(30) Foreign Application Priority Data
Mar. 16, 1998 (JP) .......................... 10-064918

(51) Int. Cl.[7] ................................ H04L 5/16
(52) U.S. Cl. ...................... 370/296; 370/294
(58) Field of Search ................ 370/276, 277, 370/278, 279, 280, 282, 285, 294, 296

(56) References Cited

U.S. PATENT DOCUMENTS 4,633,461 A * 12/1986 Banton et al. .............. 370/384
5,051,982 A * 9/1991 Brown et al. ............... 370/381
5,623,489 A * 4/1997 Cotton et al. ............... 370/381
5,987,098 A * 11/1999 Wintour ........................ 379/3
6,125,111 A * 9/2000 Snow et al. ................. 370/360

FOREIGN PATENT DOCUMENTS

| JP | 59-125422 | 7/1984 |
|----|-----------|--------|
| JP | 8-317017  | 11/1996 |

* cited by examiner

Primary Examiner—David Vincent
Assistant Examiner—Bob A. Phunkulh
(74) Attorney, Agent, or Firm—Katten Muchin Zavis Rosenman

(57) ABSTRACT

Disclosed is a simplex/duplex switching system which can easily cope with a simplex configuration or a duplex configuration. The simplex/duplex switching system includes a first device for outputting a predetermined frame signal carrying a plurality of time slot signals; and multiple second devices, each of which is paired with another device having the same structure, wherein, when paired second devices serve together as a simplex device, each of the second devices alternately receives the time slot signals included in the predetermined frame signal; and wherein, when paired second devices serve together as a duplex device, both of the second devices receive all of the time slot signals included in the predetermined frame signal.

12 Claims, 11 Drawing Sheets

SIMPLEX/DUPLEX SWITCHING SYSTEM

BACKGROUND OF THE INVENTION

1. Field of the Invention

The present invention relates to a simplex/duplex switching system which can switch simplex/duplex structures, and in particular to a simplex/duplex switching system which has as a feature a simplex/duplex structure between a communication channel device and a signal processor.

2. Related Arts

FIG. 9 is a block diagram illustrating an example simplex connection structure for a communication channel device, which serves as a first device, and a line signal processor, which serves as a second device.

The communication channel device can be, for example, a time switch for an STM switchboard, and the line signal processor can be a subscriber circuit which handles a subscriber line at the STM switchboard and can also be a common unit for changing the speed of a time slot.

In FIG. 9, a communication channel device 1 has a duplex structure consisting of types #0 and #1. In this case, n line signal processors 2 receive a frame signal from the #0 or the #1 communication channel device 1, so that time slots which are multiplexed in a frame signal are output separately to the individual n line signal processors 2.

Therefore, assuming that there are n simplex signal processors, time slots TS corresponding to the communication channel devices are:

TS(S1) . . . TS group for S1
TS(S2) . . . TS group for S2
TS(Sn) . . . TS group for Sn.

In FIG. 10 is shown an example of the duplexing of the n line signal processors (T1 to Tn). That is, when n line signal processors 2 (T1 to Tn) are paired to obtain ½n pairs of line processors 2, the relationships of the communication channel devices and time slots are TS(T1)=TS(T2)
TS(T3)=TS(T4)
TS(Tn−1)=TS(Tn).

The same TS is output by the communication channel device to the paired signal processors 2.

In this manner, the line signal processors 2 having a simplex structure and a duplex structure are separately connected to the communication channel device 1. Generally, the devices are constructed as panel units, and as is shown in FIG. 11, are assembled on a shelf inside the case of a communication apparatus. For this purpose, designated areas on the self are selected for the assembly of the simplex and the duplex deices.

Thus, when the number of devices having a simplex structure or a duplex structure is smaller than the number of areas which are available on a shelf, there are extra, unoccupied spaces on the shelf, and this contributes to an unwanted increase in the size of a communication apparatus.

Furthermore, since the essential circuit portions of a signal processor handling simplex/duplex configurations are used in common, it is uneconomical for a signal processor to be designed as a dedicated simplex structure or as a dedicated duplex structure. It is preferable that the signal processor be employed selectively as a simplex structure or as a duplex structure.

SUMMARY OF THE INVENTION

It is, therefore, one objective of the present invention to provide a simplex/duplex switching system which can easily handle either a simplex configuration or a duplex configuration.

It is another objective of the present invention to provide a simplex/duplex switching system for a communication apparatus which comprises a communication channel device and a line signal processor.

To achieve the above objectives, according to the present invention, the basic structure of a simplex/duplex switching system includes:

a first device for outputting a predetermined frame signal carrying a plurality of time slot signals; and multiple second devices, each of which is paired with another device having the same structure, wherein, when paired second devices together serve as a simplex device, each of the second devices alternately receives the time slot signals included in the predetermined frame signal, and wherein, when paired second devices together serve as a duplex device, both of the second devices receive all of the time slot signals included in the predetermined frame signal.

In the above structure, the first device is a communication channel device, and the paired second devices are signal processors.

Also, the first device has a duplex structure constituted by two communication channel devices having the same arrangement.

In addition, when the paired second devices together serve as a simplex device, multiplexed signals output by the second devices are received by the first device, which in turn generates a frame signal.

Further, when the pair of the second devices serves as a duplex device, a signal output by one of the second devices is received by the first device, which in turn generates a frame signal.

Moreover, the first device is a communication channel device, and the paired second devices are signal processors.

Other objectives and features of the invention will become apparent during the course of the description of the preferred embodiments, which is given while referring to the accompanying drawings.

DETAILED DESCRIPTION OF THE PREFERRED EMBODIMENTS

Figure 1:
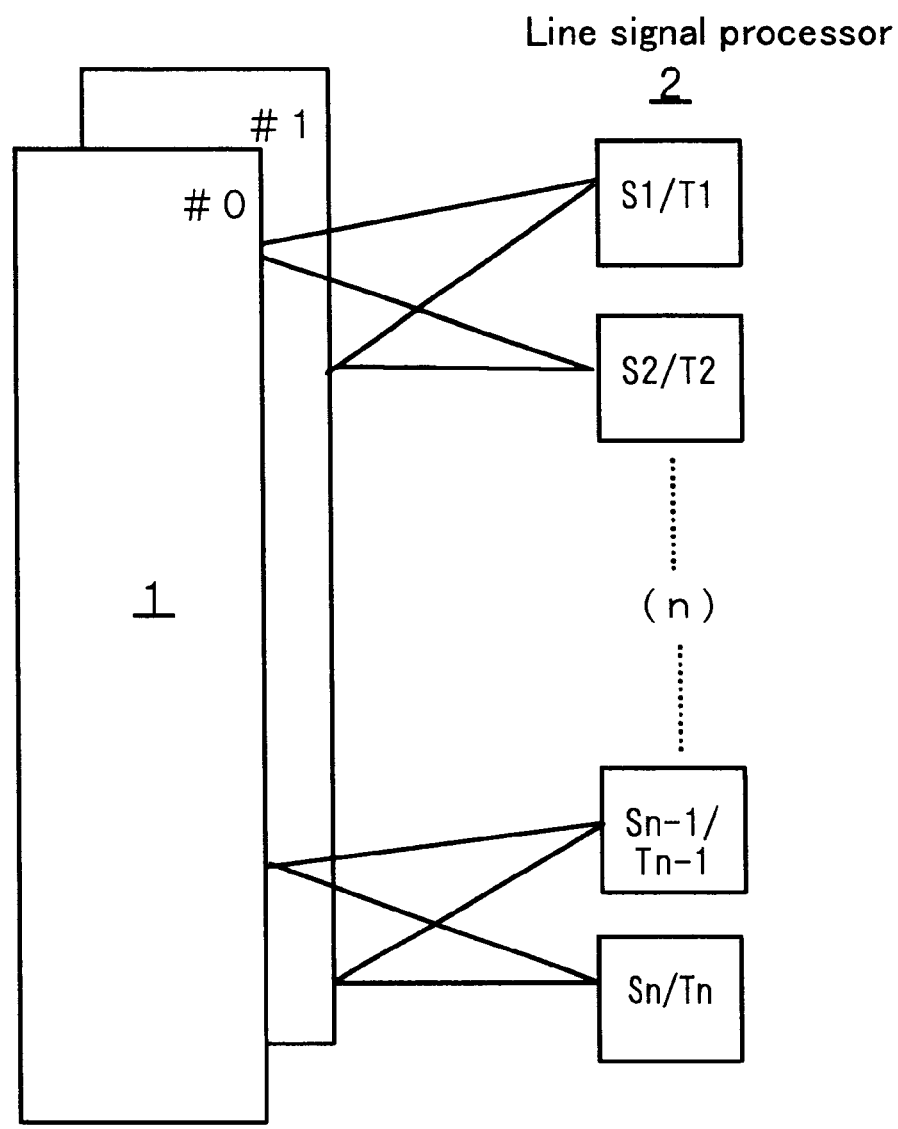
FIG. 1 is a diagram illustrating the basic structure of a simplex/duplex switching system according to the present invention.

The preferred embodiments of the present invention will now be described while referring to the accompanying drawings. It should be noted that the same reference numerals are used throughout to denote corresponding or identical components.

FIG. 1 is a diagram illustrating the basic structure of a simplex/duplex switching system according to one embodiment of the present invention. In this embodiment, n line signal processors 2 having a simplex configuration and a duplex configuration are connected to a doubled communication channel device 1.

The feature of the basic structure of the simplex/duplex switching system is that the n line signal processors 2 are paired. For a simplex configuration, the paired line signal processors 2 alternately receive time slots included in a frame signal output by the communication channel device 1.

For a duplex configuration, both of the paired line signal processors 2 receive all the time slots included in the frame signal output by the communication channel device 1.

Figure 2:
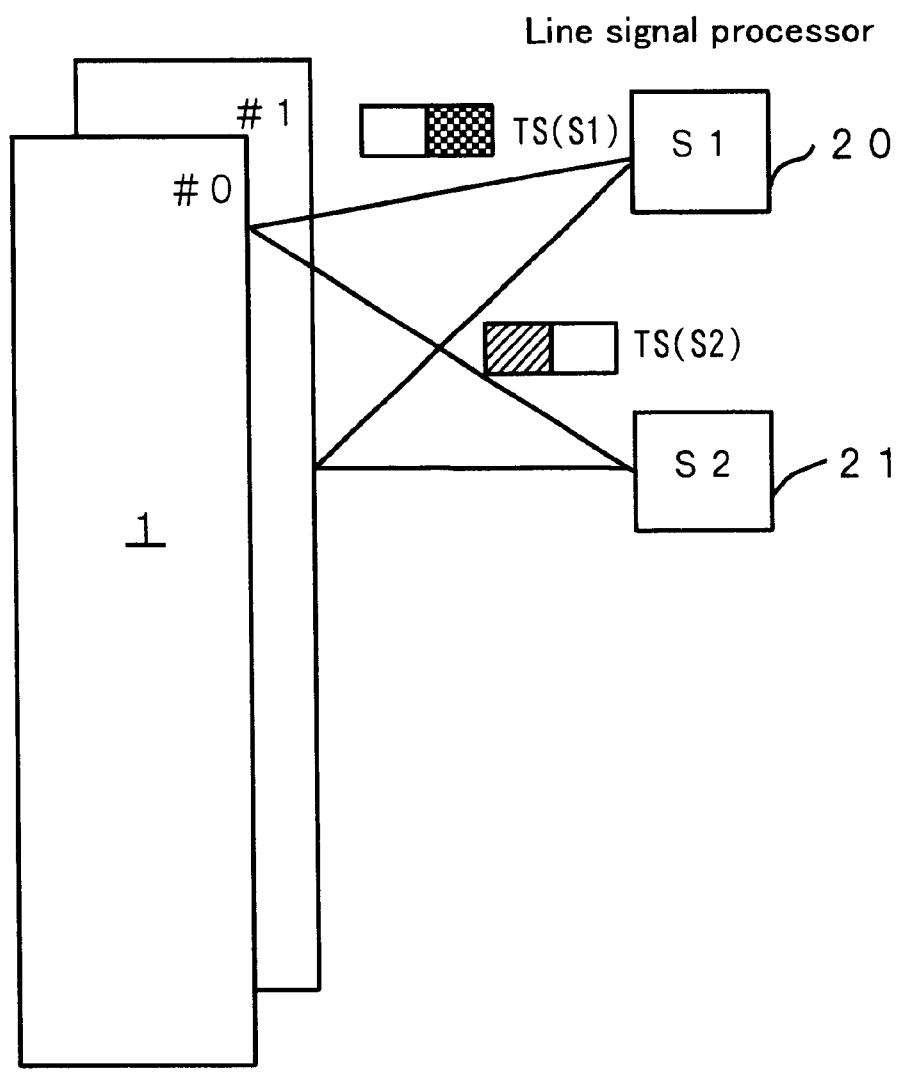
FIG. 2 is a diagram for explaining the structure in FIG. 1 used for the simplex configuration.

FIG. 2 is a diagram illustrating the above described simplex switching system. In FIG. 2, to simplify the explanation, of the n processors 2, only one pair of line signal processors, 20 and 21, are shown.

Since in the simplex configuration an independent time slot TS corresponds to each signal processor, time slots included in a frame signal output by the #0 or #1 communication channel device 1 are alternately input. Thus, the number of time slots TS allotted to the signal processors 20 and 21 are reduced by ½, compared with those allotted for the duplex configuration.

In FIG. 2 is shown an example where time slots are alternately output by the #0 communication channel device 1 to the line signal processors 20 and 21.

Figure 10:
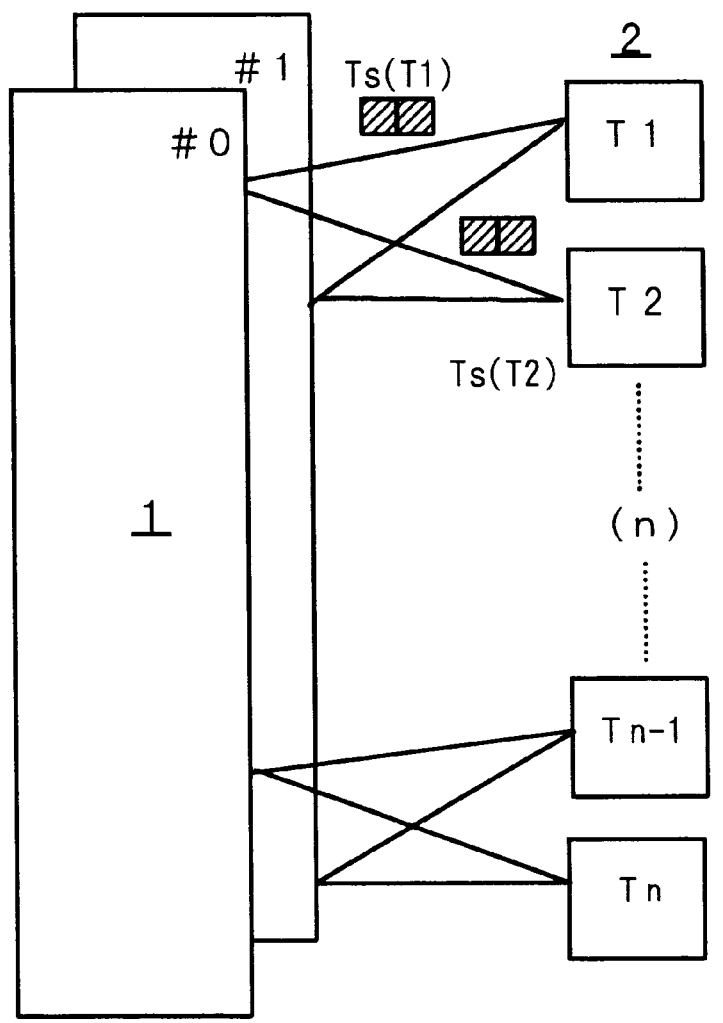
FIG. 10 is a diagram for explaining the duplex configuration for a communication channel device and signal processors.
Figure 11:
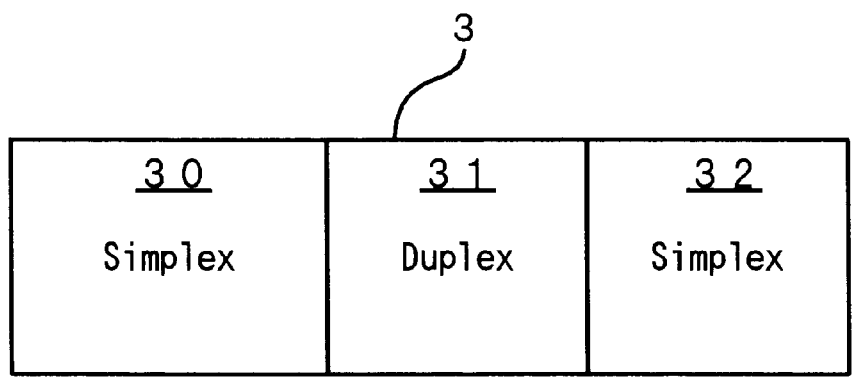
FIG. 11 is a diagram illustrating an example structure for a shelf inside the case of a communication apparatus.

The transmission shown in FIG. 10 is also performed for the duplex configuration, and all the time slots in a frame signal output by the selected communication channel device 1, either #0 or #1, are received by the paired signal processors.

Figure 3:
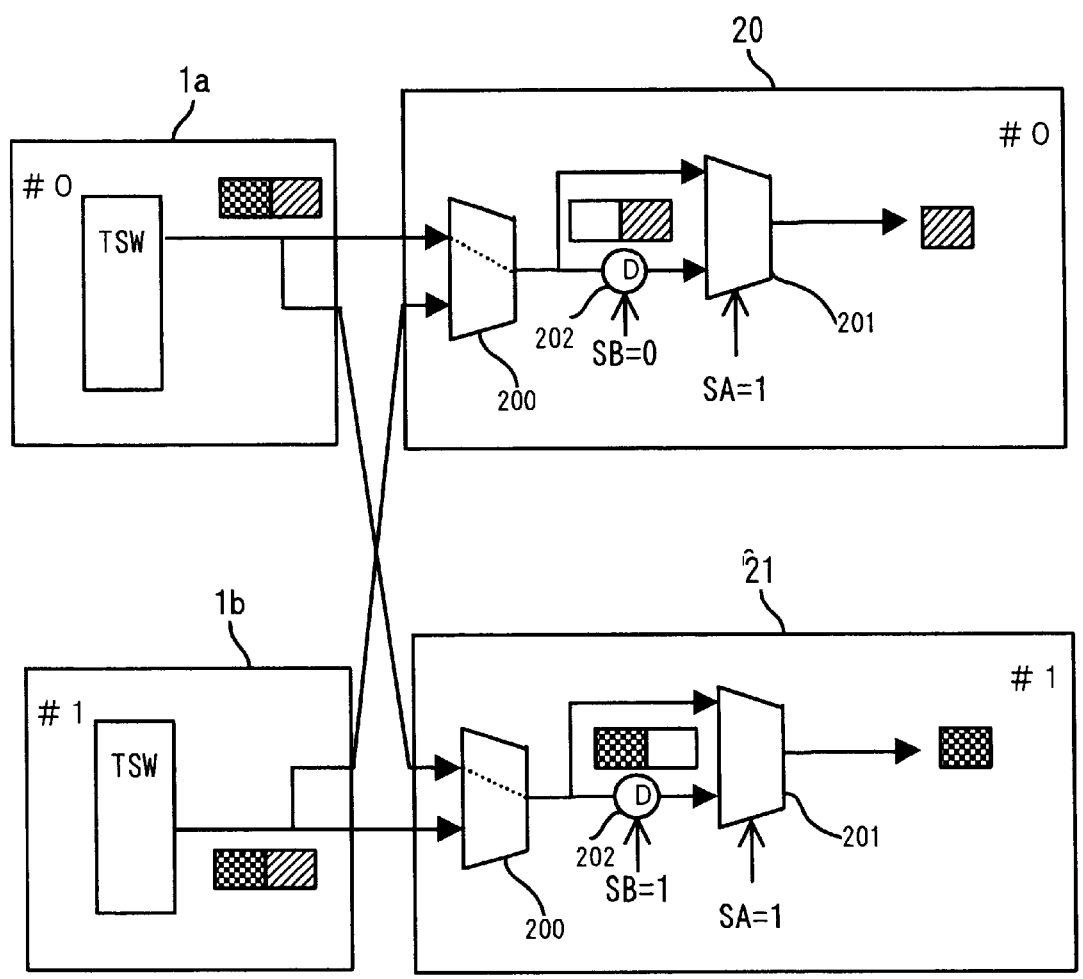
FIG. 3 is a diagram for explaining one embodiment of the present invention according to which signals are transmitted by communication channel devices to signal processors.

FIG. 3 is a diagram illustrating the embodiment of the present invention whereby signals are transmitted from communication channel devices 1 to signal processors 2 having a simplex configuration (in the downstream direction).

In FIG. 3, a #0 communication channel device 1a and a #1 communication channel device 1b are shown as the communication channel devices 1, and only the paired signal processors 20 and 21 of the n signal processors 2 are shown.

In this embodiment, the signals from the #0 and #1 communication channel devices 1a and 1b are transmitted to the signal processors 20 and 21. However, if the #0 communication channel device 1a is in the ACT state, only the signal from the #0 communication channel device 1a is regarded as being valid, as will be described later.

Figure 8:
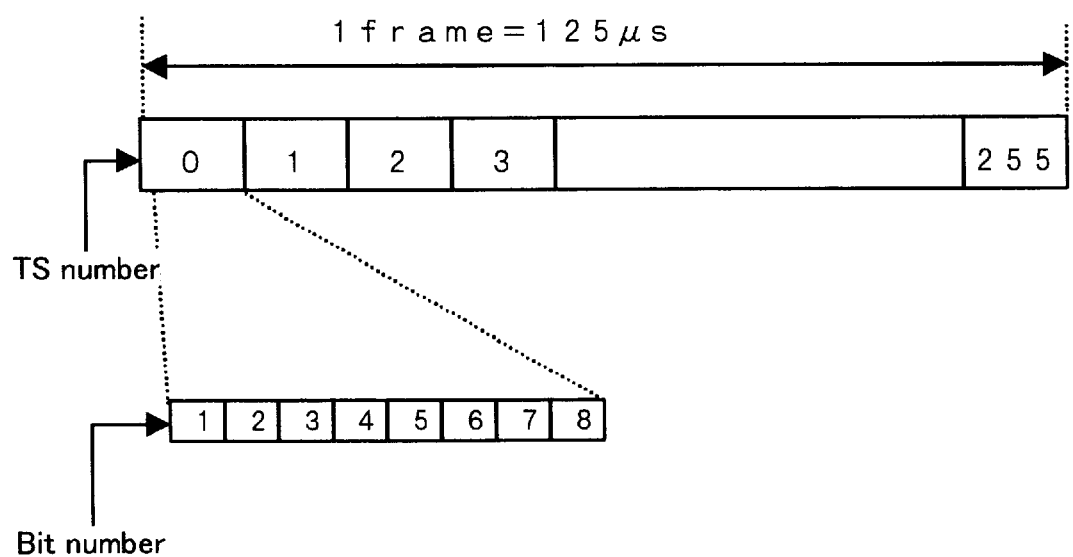
FIG. 8 is a diagram for explaining the structure of a frame signal according to the present invention.
Figure 9:
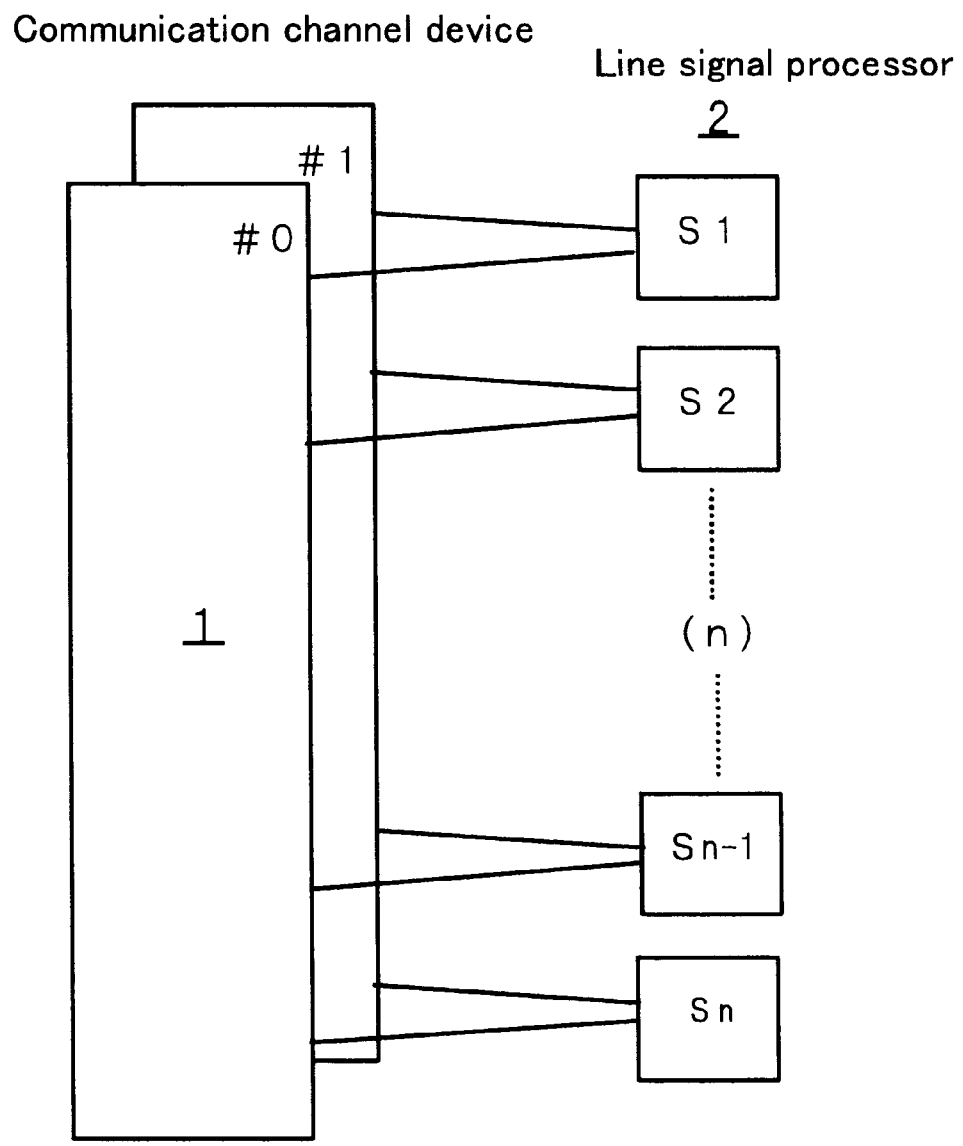
FIG. 9 is a diagram for explaining the simplex configuration for a communication channel device and signal processors.

An example structure for a frame signal will be explained while referring to FIG. 8. The frame signal has a frame period of 125 μs, and consists of 256 time slots TS, each of which is an 8-bit signal. The thus structured frame signal is transmitted to the signal processors 20 and 21.

In the present invention, the interfaces of the signal processors 20 and 21 each include a type selector 200, a simplex/duplex selection gate circuit 201, and a time slot selector 202. Such a signal processor structure is provided in common for the n signal processors.

When a select signal SA is input to the simplex/duplex selection gate circuit 201, if the select signal SA is logic 1, simplex is selected, and if the select signal SA is logic 0, duplex is selected.

Then, when the time slot selector 202 receives a select signal SB, it selects either the first or the second time slot in the frame signal which is transmitted by the communication channel device 1a.

A desirable circuit can be employed as the time slot selector 202. As an example, resistors are arranged in two stages, and when SB=0, the first time slot (TS1 if there are a TS1 and a TS2) is output, while when SB=1, the last time slot (TS2 if there are a TS1 and a TS2) is output.

In the embodiment in FIG. 3, since the select signal SB=1, the #0 signal processor 20 selects the first of the two time slots, and the #1 signal processor 21 selects the last of the two time slots.

In addition, in FIG. 3, in order to change the simplex/duplex switching system so that it can handle a simplex configuration, upon receipt of the select signal SA=1, the simplex/duplex selection gate circuit 201 regards the output of the time slot selector 202 as being valid.

Furthermore, in this embodiment, the time slot selector 202 of the #0 signal processor 20 selects the first time slot, while the time slot selector 202 of the #1 signal processor 21 selects the last time slot. As a result, the time slot signals are received separately by the #0 signal processor 20 and the #1 signal processor 21, as is shown in FIG. 3.

Figure 4:
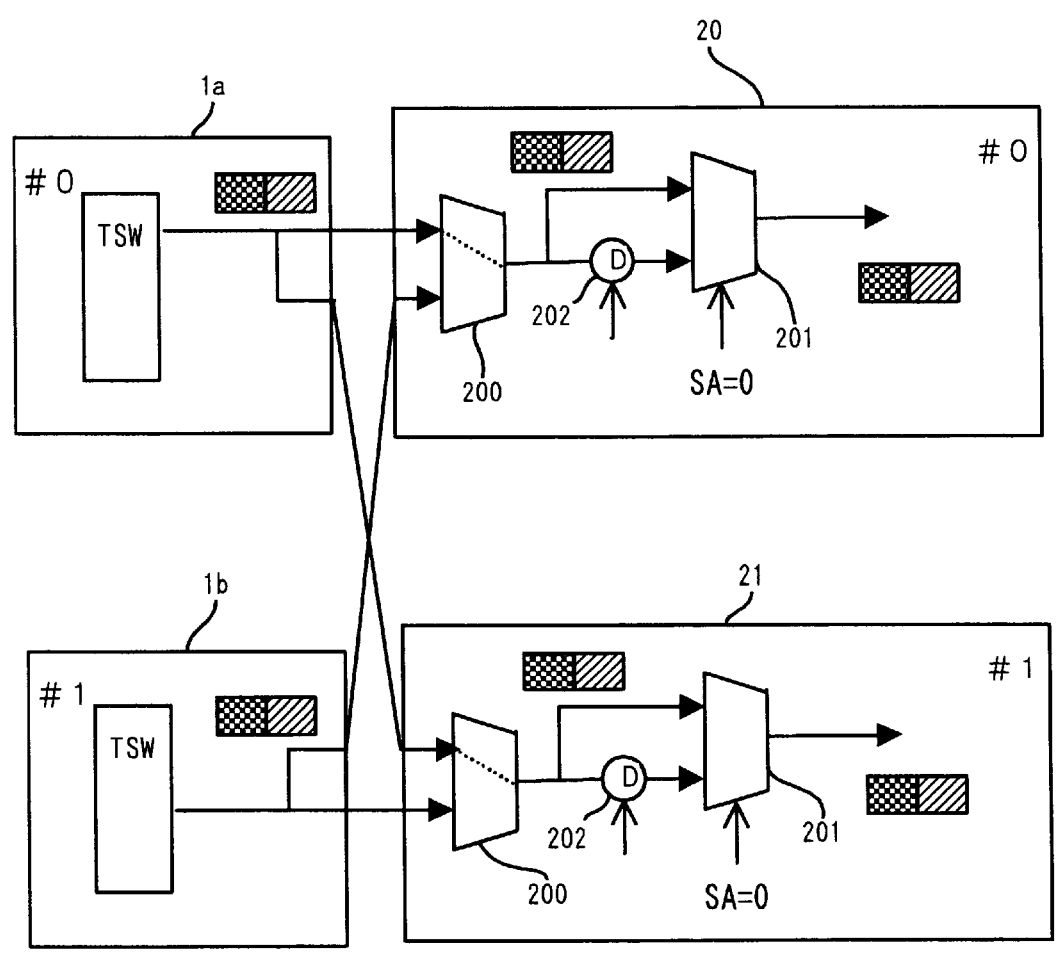
FIG. 4 is a diagram for explaining a simplex/duplex switching system, according to another embodiment of the present invention, which has a duplex configuration whereby signals are transmitted from communication channel devices to signal processors.

FIG. 4 is a diagram illustrating a simplex/duplex switching system, according to another embodiment of the present invention, which is changed to a duplex configuration in a case where frame signals are transmitted by the communication channel devices 1 to the signal processors 2.

In this embodiment, assume that a #0 communication channel device 1a has been selected. Upon receipt of a select signal SA=0, a simplex/duplex selection gate circuit 201 regards the output of a type selection gate circuit 200 as being valid. Thus, the output of the #0 communication channel device 1a is input as an valid signal by paired signal processors 20 and 21.

Figure 5:
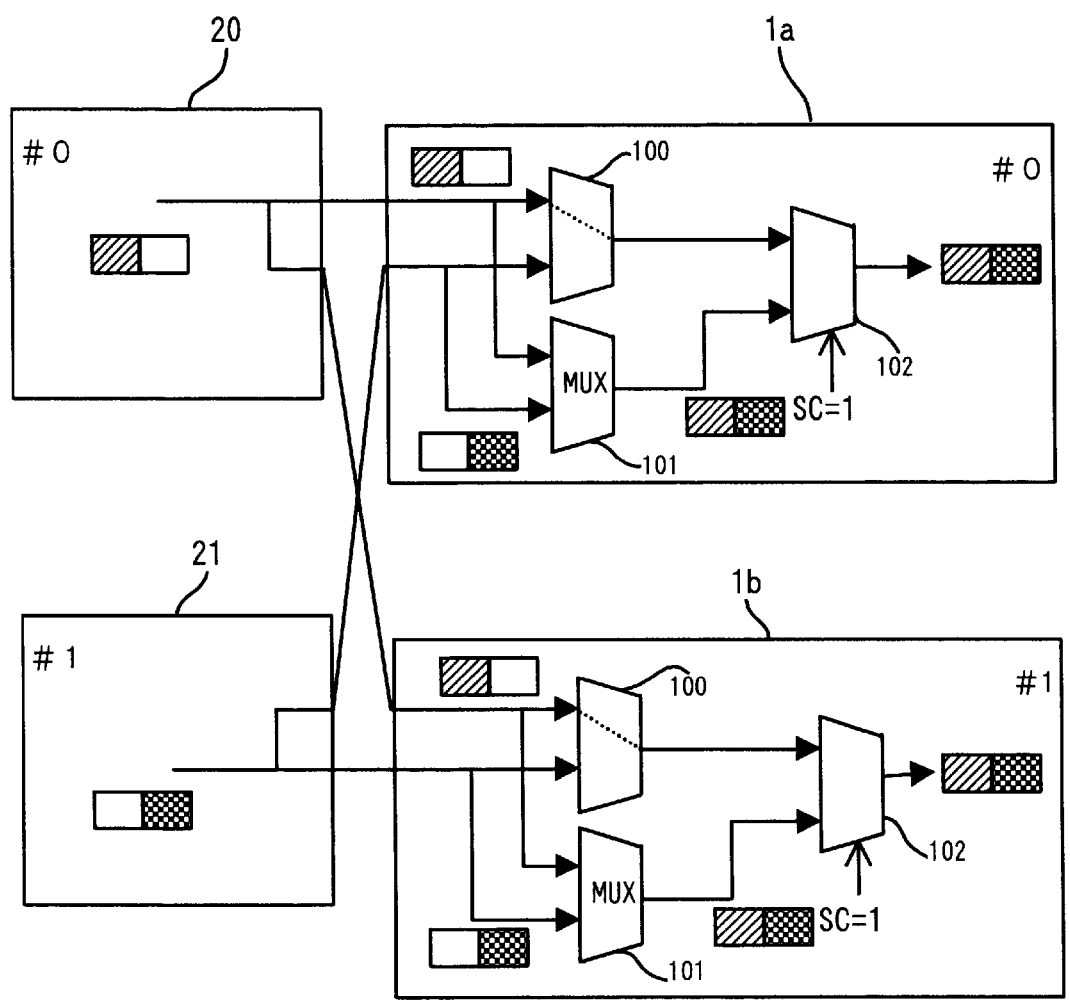
FIG. 5 is a diagram, corresponding to the embodiment in FIG. 3, for explaining a case where signals are transmitted by signal processors having a simplex structure to communication channel devices (in the upstream direction)

FIG. 5 is a diagram, corresponding to the embodiment in FIG. 3, for explaining a case where signals are transmitted by signal processors having a simplex configuration to a communication channel device (in the upstream direction). In FIG. 5, of a plurality of signal processors, only paired signal processors 20 and 21 are shown. #0 and #1 communication channel devices 1a and 1b, which have duplex configurations, are also shown.

The communication channel devices 1a and 1b have like structures, each including a type selection gate circuit 100, a multiplexer 101 and a simplex/duplex selection gate circuit 102. When the signal processor 2 has a duplex configuration, the type selection gate circuit 100 determines which output should be valid, either the output of the #0 signal processor 20 or the output of the #1 signal processor 21.

Since the simplex configuration is employed in FIG. 5, signals output by the #0 signal processor 20 and the #1 signal processor 21 are transmitted to the multiplexer 101, which multiplexes the signals. The multiplexed signal is then transmitted to the simplex/duplex selection gate circuit 102. Upon receipt of a select signal SC=1, the simplex/duplex selection gate circuit 102 regards the output of the multiplexer 101 as being valid, and receives both the #0 and the #1 signals as the same multiplexed signal.

Figure 6:
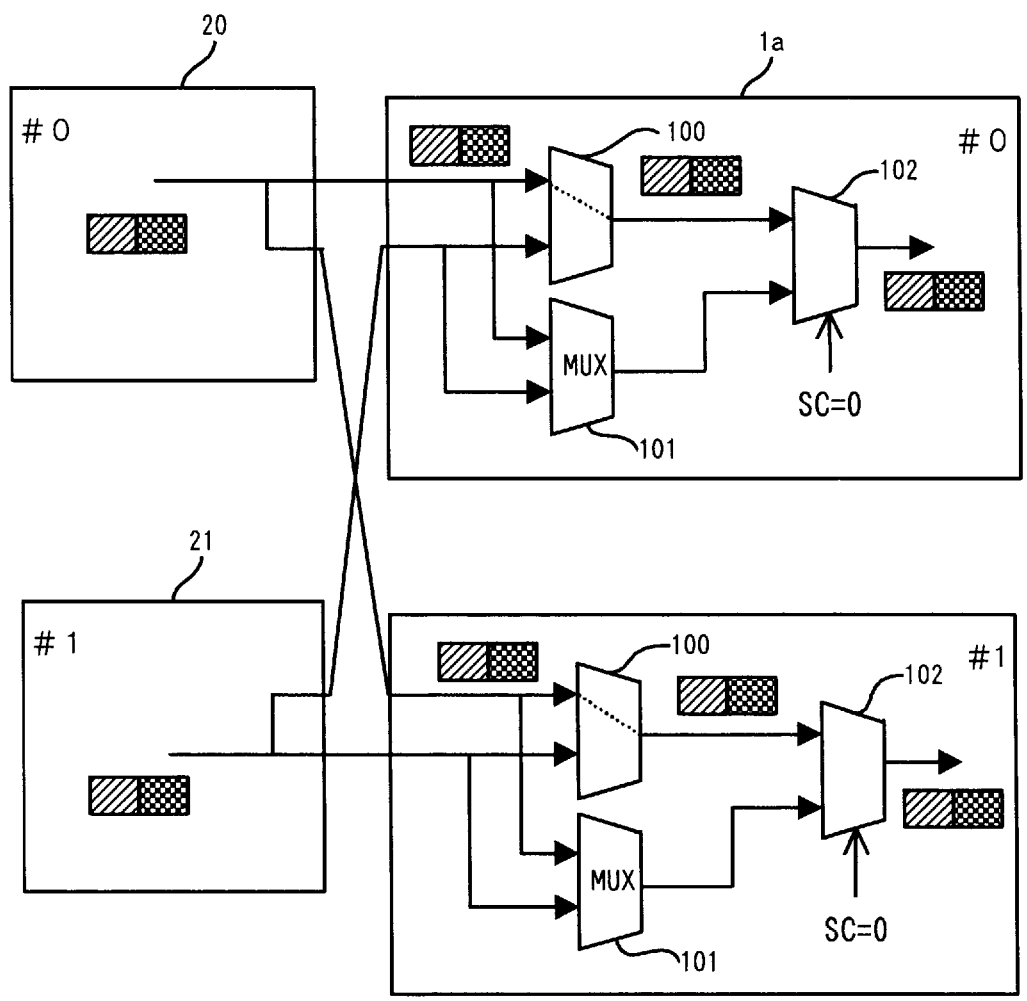
FIG. 6 is a diagram, corresponding to the duplex configuration in the embodiment in FIG. 4, for explaining a case where signals are transmitted by signal processors having a duplex configuration to communication channel devices (in the upstream direction)

FIG. 6 is a diagram, corresponding to the duplex configuration in the embodiment in FIG. 4, for explaining a case where signals are transmitted to a communication channel device (in the upstream direction) by signal processors having a duplex configuration.

In this example, paired signal processors 20 and 21 output identical same multiplexed frame signals, and a type selection gate circuit 100 selects the #0 signal processor 20. Thus, a signal from the #0 signal processor 20 is transmitted to the respective type selection gate circuits 100 in the #0 and the #1 communication channel devices 1*a* and 1*b*.

Figure 7:
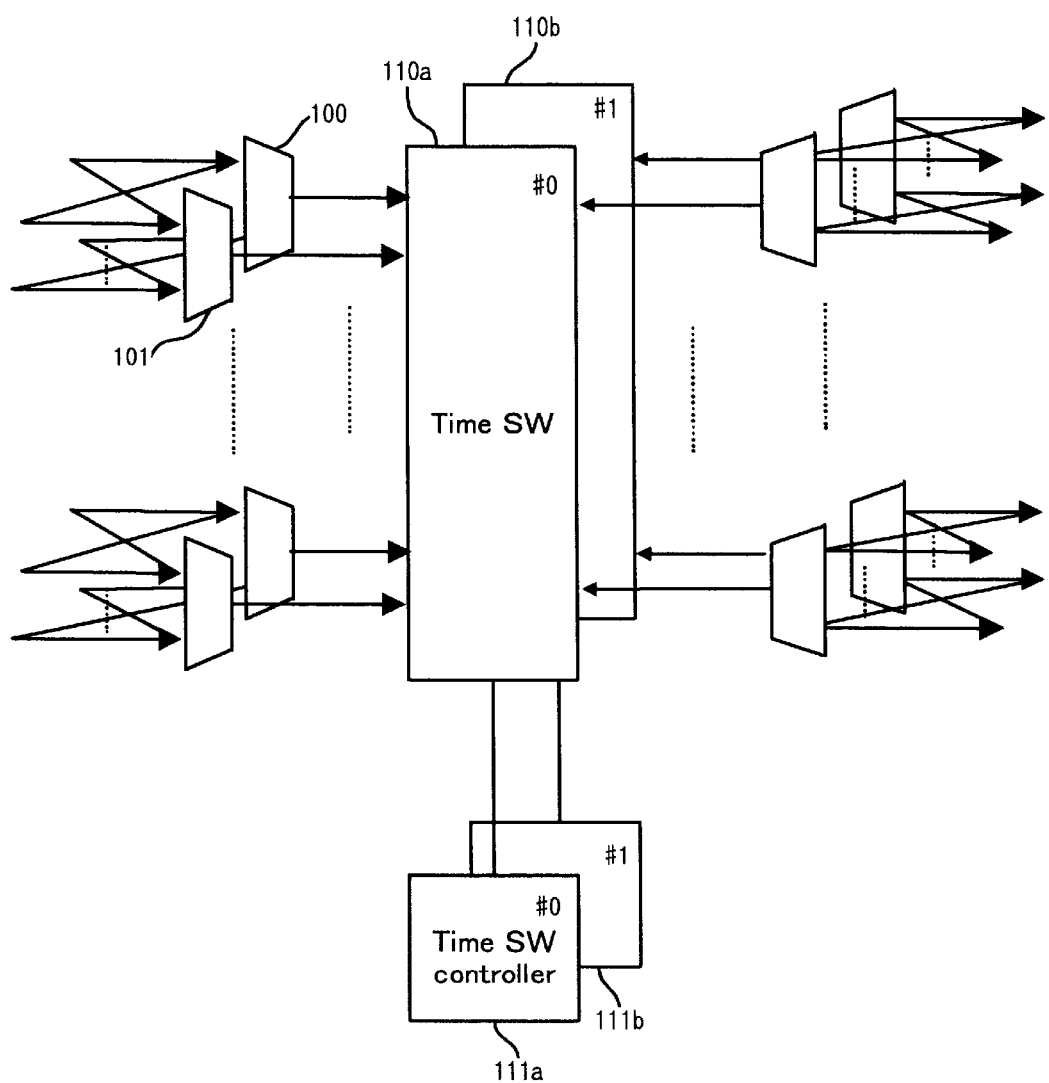
FIG. 7 is a diagram illustrating an example structure of a communication channel device.

FIG. 7 is a diagram illustrating an example arrangement for the communication channel device. Duplex time switches 110*a* and 110*b* are controlled by paired duplex time switches 111*a* and 111*b*.

The selection gate circuits 100 and the multiplexers 101, which are equivalent to those shown in FIG. 5 or 6, are connected to the time switches 111*a* and 111*b*. The simplex/duplex selection gate circuits 102 in FIGS. 5 and 6 are not shown in FIG. 7 because they are assumed to be included in the time switches 111*a* and 111*b*.

As has been explained for the embodiments while referring to the drawings, according to the present invention, a simplex/duplex switching system can be provided to handle a simplex/duplex configuration. Furthermore, according to the present invention, a simplex/duplex switching system can be provided for a communication apparatus which comprises a communication channel device and a line signal processor.

The above described embodiments are employed only for explaining the present invention, and the present invention is not limited to these embodiments. The protective scope of the present invention is defined by claims, and the equivalent of the range of the claims is also included within the protective scope of the present invention.

What is claimed is:

1. A simplex/duplex switching system comprising:

a first device for outputting a predetermined frame signal carrying a plurality of time slot signals; and multiple second devices, each of which is paired with another device having the same structure, wherein, when paired second devices together serve as a simplex device, each of said second devices alternately receives said time slot signals included in said predetermined frame signal, and wherein, when paired second devices together serve as a duplex device, both of said second devices receive all of said time slot signals included in said predetermined frame signal.

2. A simplex/duplex switching system according to claim 1, wherein said first device is a communication channel device, and said paired second devices are signal processors.

3. A simplex/duplex switching system according to claim 2, wherein said first device has a duplex structure constituted by two communication channel devices having the same arrangement.

4. A simplex/duplex switching system according to claim 1, wherein, when said paired second devices together serve as a simplex device, multiplexed signals output by said second devices are received by said first device, which in turn generates a frame signal.

5. A simplex/duplex switching system according to claim 1, wherein, when said pair of said second devices serves as a duplex device, a signal output by one of said second devices is received by said first device, which in turn generates a frame signal.

6. A simplex/duplex switching system according to claim 4, wherein said first device is a communication channel device, and said paired second devices are signal processors.

7. A simplex/duplex switching system comprising:

a first device for outputting a predetermined frame signal carrying a plurality of time slot signals; and n second devices having the same structure, each of which is paired with another device, wherein, when paired second devices together serve as a simplex device, each of said second devices alternately receives said time slot signals included in said predetermined frame signal, and wherein, when paired second devices together serve as a duplex device, both of said second devices receive all of said time slot signals included in said predetermined frame signal.

8. A simplex/duplex switching system according to claim 7, wherein said first device is a communication channel device, and said paired second devices are signal processors.

9. A simplex/duplex switching system according to claim 8, wherein said first device has a duplex structure constituted by two communication channel devices having the same arrangement.

10. A simplex/duplex switching system according to claim 7, wherein, when said paired second devices together serve as a simplex device, multiplexed signals output by said second devices are received by said first device, which in turn generates a frame signal.

11. A simplex/duplex switching system according to claim 7, wherein, when said pair of said second devices serves as a duplex device, a signal output by one of said second devices is received by said first device, which in turn generates a frame signal.

12. A simplex/duplex switching system according to claim 10, wherein said first device is a communication channel device, and said paired second devices are signal processors.

* * * * *